United States Patent [19]

Hoover et al.

[11] Patent Number: 5,168,571
[45] Date of Patent: Dec. 1, 1992

[54] SYSTEM FOR ALIGNING BYTES OF VARIABLE MULTI-BYTES LENGTH OPERAND BASED ON ALU BYTE LENGTH AND A NUMBER OF UNPROCESSED BYTE DATA

[75] Inventors: Russell D. Hoover; John D. Irish; David W. Sollender, all of Rochester, Minn.

[73] Assignee: International Business Machines Corporation, Armonk, N.Y.

[21] Appl. No.: 469,619

[22] Filed: Jan. 24, 1990

[51] Int. Cl.⁵ .............................. G06F 9/30
[52] U.S. Cl. ........................ 395/800; 395/375; 364/DIG. 1; 364/239.3; 364/243.3; 364/245.1; 364/254.8; 364/254.9; 364/259; 364/271.8
[58] Field of Search ................ 395/375, 800

[56] References Cited

U.S. PATENT DOCUMENTS

| | | | |
|---|---|---|---|
| 3,331,056 | 7/1967 | Lethin et al. | 395/775 |
| 4,037,213 | 7/1977 | Atkins et al. | 395/375 |
| 4,317,170 | 2/1982 | Wada et al. | 395/375 |
| 4,456,955 | 6/1984 | Yanagita et al. | 395/375 |
| 4,580,238 | 4/1986 | Sawada | 364/736 |
| 4,654,781 | 3/1987 | Schwartz et al. | 395/425 |

FOREIGN PATENT DOCUMENTS

0317473  5/1989  European Pat. Off. .

Primary Examiner—Thomas C. Lee
Assistant Examiner—Krisna Lim
Attorney, Agent, or Firm—J. Michael Anglin

[57] ABSTRACT

A hardware data string operation controller is provided which (1) performs variable length main store string operation; (2) executes at least a subset of both left to right and right to left instructions, having variable length multibyte operands; and (3) performs multicycle storage to storage operations on variable length multibyte operand data, all under the control of a single control word. The controller comprises (a) means for dynamically determining (and if necessary, adjusting) the maximum number of operand related data string bytes that can be processed (by the controller) during each machine cycle (referred to as "data mode" calculation/alteration); (b) means for performing partial machine "holdoffs" (i.e., inhibiting selectively chosen register updates without stopping all processor operation), whenever at least a plurality of machine cycles is required to completely execute a control word; and (c) means for predicting storage operations (fetches and stores required by the controller) during the machine cycle prior to the cycle during which said storage operations are to be performed.

4 Claims, 5 Drawing Sheets

FIG. 4
DATA MODE = I (BYTE MODE)

FIG. 5
DATA MODE = 2 (HALFWORD MODE)

SYSTEM FOR ALIGNING BYTES OF VARIABLE MULTI-BYTES LENGTH OPERAND BASED ON ALU BYTE LENGTH AND A NUMBER OF UNPROCESSED BYTE DATA

BACKGROUND OF THE INVENTION

1. Field of the Invention

The invention relates generally to the field of data processing systems and concerns the execution of instructions on multibyte data strings. More particularly, the invention relates to a hardware data string operation controller (also referred to herein as a hardware "sequencer"), which is capable of manipulating data in main storage by processing certain left to right instructions (i.e., instructions that are processed from a first memory address to a higher second memory address), or right to left instructions (i.e., instructions that are processed from a first memory address to a lower second memory address), having variable length operands, under the control of a single control word.

2. Description of the Related Art

Main store string operations are well known and can be used in computer systems, such as the IBM System 370, to transfer data from one main store memory location to another. These operations may alter the data being transferred in conjunction with performing certain arithmetic logic unit (ALU) operations (for example, an "ADD", or similar two operand operation), or the data being transferred can be moved unchanged (for example, via a "MOVE" type operation).

Additionally, well known operations exist that compare two data strings without storing any result back to main store (for example, an instruction that tests for 0 on the difference between two operands).

The length of data strings serviced by the aforementioned types of operations can vary from one byte to hundreds of bytes.

A typical instruction processing sequence (in a system like the IBM System 370) would entail fetching an instruction from main store; decoding the instruction; translating the virtual address of the operand(s) associated with the instruction to a main store address(es); and then performing the operation specified by the fetched instruction on the operand(s).

A fault signal is typically generated if the translation indicates a main store address does not exist for one or more operands.

Assuming no fault, it is well known in the prior art to perform the aforementioned data string operations (upon the operands associated with a given instruction), by using microcode driven hardware. This hardware, in conjunction with the microcode, actually performs the function designated by the given instruction.

The hardware controls of a microprogram controlled computer are mainly data gates that route data into and out of registers, counters, adders, and so on. It is typical in such systems for one instruction (program instruction, microcode, microdeinstruction, or control word) to provide the data gates and controls for one machine cycle.

A simple and well known technique for performing data string operations, is to use a microprocessor controlled computer to execute one control word for each byte of data being processed within a string. Using this technique, to for example add the contents of a first doubleword (8 bytes) to a second doubleword, would require a minimum of 8 machine cycles (plus overhead for fetching the data, storing the results, etc.). Such techniques are unacceptably slow when measured against the speed of other present day processor components (such as cache memory) which interface with the string processing mechanism.

Another example of a prior art technique for performing data string operations is taught in copending U.S Pat. application Ser. No. 07/121,443, filed on Nov. 17, 1987, now U.S. Pat. No. 4,933,849 issued on Jun. 12, 1990, assigned to the same assignee as the present invention. This copending patent application, entitled "Microcode Branch Based Upon Operand Length and Alignment", is hereby incorporated by reference.

The incorporated copending patent application (sometimes referred to hereinafter as the "Microcode Branch" invention), teaches a hardware assist running under horizontal microcode. The Microcode Branch invention operates by branching to one of a plurality of microcode subroutines (which actually perform the data manipulation), based upon the alignment of the data strings being processed and number of bytes to be operated on.

In particular, the branching technique taught requires: (1) a determination of operand byte alignment (alignment within registers into which the operands are fetched from main store); (2) a determination of the number of operand bytes remaining to be processed by a given instruction; and (3) a determination of which of a plurality of microinstruction (control word) subroutines should be called upon to perform the actual data manipulation, based at least in part, on the number of bytes of the operand remaining to be processed.

Utilizing the techniques taught in the incorporated copending patent application, a system's data flow paths can be more effectively used, particularly when compared with the byte by byte processing approach first referred to hereinabove.

However, the techniques taught in the incorporated reference are problematic in that they require the use of an excessive amount of control storage (to store the various subroutines) and require the expenditure of significant amounts of overhead to perform maintenance operations on string pointers and counters.

Furthermore, the techniques taught in the incorporated reference only relate to left to right instructions (e.g., "MOVE" instructions), and are not suitable for processing certain multibyte variable length right to left instructions (such as an "ADD").

Accordingly, it would be desirable if methods and apparatus could be provided which perform variable length main store string operations using only a single control word rather than the plurality of control words that are required by prior art string processing techniques.

Furthermore, it would be desirable to be able execute at least a subset of both right to left instructions and left to right instructions, having variable length multibyte operands, using the aforementioned desirable methods and apparatus.

Still further, it would be desirable to be able to perform multicycle storage to storage operations on variable length multibyte operand data, using only the single control word referred to hereinbefore.

Further yet, it would be desirable to be able to provide a hardware implementation of the desired methods and apparatus, which: (1) rapidly performs string processing by anticipating the need to fetch (and store) data (so as to be compatible with, and take advantage of, other high speed processor components); (2) minimizes control store requirements by eliminating the need to store the aforementioned plurality of microcode subroutines; and (3) reduces the processing time needed to perform multibyte variable length data string operations over one or more machine cycles by eliminating both the need to perform software branches, and the need to maintain certain string pointers and counters.

SUMMARY OF THE INVENTION

It is an object of the invention to provide methods and apparatus that perform variable length main store string operations under the control of only a single control word.

It is a further object of the invention to provide methods and apparatus which are able to execute at least a subset of both left to right and right to left instructions, having variable length multibyte operands, where the main store string processing operations required to implement an instruction may be executed under the control of a single control word.

Furthermore, it is an object of the invention to provide methods and apparatus for performing multicycle storage to storage operations on variable length multibyte operand data, where the multicycle operations may be executed under the control of a single control word.

According to the invention, a hardware data string operation controller is provided which realizes the aforestated objectives. More particularly, the controller comprises: (a) means for dynamically determining (and if necessary, adjusting) the maximum number of operand related data string bytes that can be processed (by the controller) during each machine cycle (hereinafter referred to as "data mode" calculation/alteration); (b) means for performing partial machine "holdoffs" (i.e., inhibiting selectively chosen register updates without stopping all processor operation), whenever at least a plurality of machine cycles is required to completely execute a control word; and (c) means for predicting storage operations (fetches and stores required by the controller) during the machine cycle prior to the cycle during which said storage operations are to be performed.

By performing data mode calculation/alteration dynamically, the novel sequencer behaves in a similar fashion to the aforementioned Microcode Branch invention. However, the novel sequencer utilizes the result of the data mode determination to effect hardware controls, rather than predicting branches that initiate the execution of one of a plurality of microcode subroutines. As a result, the instant invention improves instruction execution time by reducing horizontal microcode intervention and eliminates the need for expending control storage on the aforementioned subroutines.

By performing partial machine holdoffs, the novel sequencer is able to execute variable length data strings utilizing a single control word. Typically, when a control word requires several cycles to complete, one primary holdoff is generated for the entire machine which inhibits various registers from being loaded until the instruction is complete. Since the novel sequencer will need to update certain of these registers (containing pointers and counters), the use of partial machine holdoffs will allow the primary holdoff signal to remain inactive, enabling any required sequencer updates to be performed.

By predicting storage operations required by the novel sequencer, machine cycles can be conserved, thereby further improving the performance of the system in which the novel sequencer is included.

The invention features the ability to perform main store string operations quickly and efficiently in a microcode driven hardware structure. In particular, execution of variable length main store string operations using only a single control word, conservation of control storage, and improved overall processor performance, are all features of the invention.

These and other objects and features of the present invention and the manner of obtaining them will become apparent to those skilled in the art, and the invention itself will be best understood by reference to the following detailed description read in conjunction with the accompanying Drawing.

DETAILED DESCRIPTION

Figure 1:
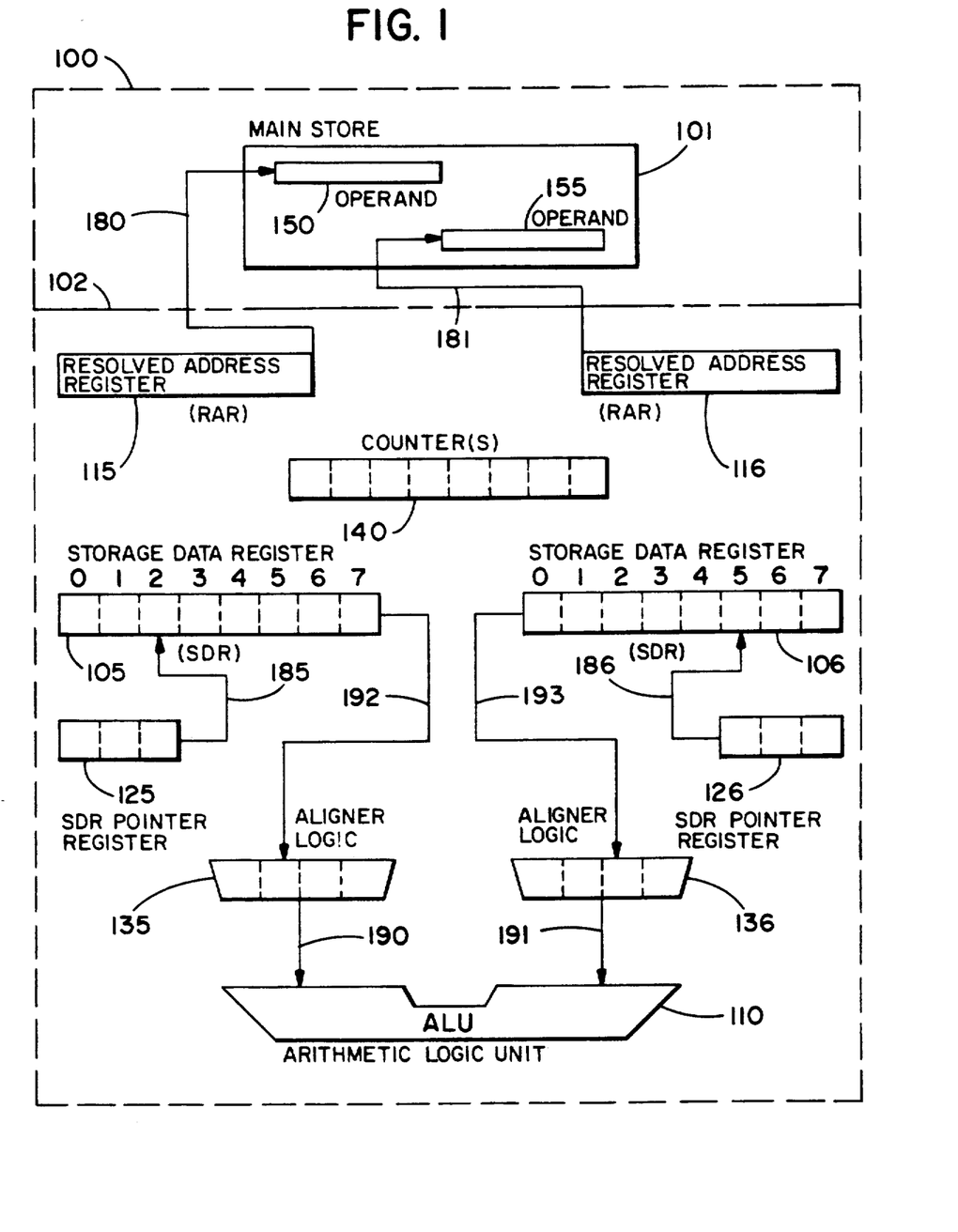
FIG. 1 depicts certain portions of an illustrative computer system (memory and a subset of processor components) which are utilized in conjunction with the novel sequencer to perform variable length main store string operations in accordance with the teachings of the invention.

As indicated hereinabove, FIG. 1 depicts certain portions of an illustrative computer system (memory and certain processor components) which are utilized in conjunction with the novel sequencer to perform variable length main store string operations.

In particular, FIG. 1 depicts computer system 100 containing main store 101 and at least one processor, processor 102. The novel sequencer is included as part of a processor architecture that, as shown in FIG. 1, includes at least the following registers and structures (all of which are taught in the incorporated copending patent application):

1. A pair of Storage Data Registers (SDRs), where each SDR is used to buffer main store data. Two SDRs are depicted in FIG. 1 and are labeled as registers 105 and 106. Typically, when an operation being performed by a processor requires data from storage, the data is moved into an SDR (via a data bus, not shown) before it can be accessed by the processor. After the processor operation involving main store data is complete, the data is stored back to the main store. In the illustrative example to be set forth hereinafter (used to illustrate the principles of the invention and provide a functional description thereof), the SDRs are assumed to be 8 bytes wide, and receive data from doubleword aligned main store locations. Two such locations are shown in FIG. 1, location 150 and 155. The choice of 8 byte wide SDRs is for the sake of illustrating a preferred embodiment of the invention and is in no way meant to limit the scope of the invention.

2. A Resolved Address Register (RAR) for each SDR. Each RAR points to the memory location in main store 101 where its affiliated SDR is buffering data to and from. Two RARs are depicted in FIG. 1, RAR 115 associated with SDR 105, and RAR 116 associated with SDR 106. RAR 115 tracks the main store location for SDR 105, while RAR 116 tracks the main store location for SDR 106. By way of example, RAR 115 is shown pointing to operand string 150 (illustrated by arrow 180), and RAR 116 is shown pointing to operand 160 (illustrated by arrow 181), in FIG. 1.

3. FIG. 1 depicts arithmetic logic unit (ALU), 110, which is a well known device for performing various logical, binary and decimal operations in a computer system. For the sake of illustration only, it is assumed that ALU 110 is capable of operating on data that is 4 bytes wide for logical and binary operations; and 2 bytes wide for decimal operations.

4. FIG. 1 also depicts SDR Pointer registers 125 and 126. SDR pointer register 125 is shown pointing into SDR 105, while SDR pointer register 126 is shown pointing into SDR 106. Each SDR pointer register indicates the byte of its associated SDR that is ready for processing. By way of example, SDR pointer register 125 is shown pointing at the third byte from the left of SDR 105 (byte 2). This is illustrated by arrow 185 in FIG. 1. SDR pointer register 26 is shown pointing at the sixth byte from the left of SDR 106 (byte 5). This is illustrated by arrow 186, in FIG. 1.

5. Two sets of alignment logic which can be directly assessed by ALU 110 when performing operations on data from main store 101, are shown in FIG. 1 as aligner logic 135 and 136. The access paths are shown as 190 and 191 respectively. Aligner logic 135 and 136 are hereinafter referred to as "aligners". In the context of the illustrative example, these aligners are each four-bytes wide and are associated with each of SDR 105 and SDR 106, respectively. Data in an SDR is moved through an aligner (via paths 192 and 193) based on SDR pointer value. This data is byte aligned and right justified in each aligner.

In a computing system such as the one described in the incorporated copending patent application, when a main store string operation is called (following instruction decode and address translation), the data pointed to by RARs 115 and 116 is fetched to SDRs 105 and 106, respectively. Aligners 135 and 136, receive the contents of SDRs 105 and 106, respectively (starting with the bytes pointed to by SDR pointer register 125 and 126); an operation is performed by ALU 110; and the result is moved into a selected one of the SDRs. After an SDR is completely processed, the contents are moved out to main store 101 (if required by the string operation type), and the RAR is updated to point to the next location in main store 101 from which data is to be fetched.

Additional hardware required to implement the novel sequencer includes, according to a preferred embodiment of the invention, a hardware register that is used to count the number of bytes to be manipulated during the string operation, and off-the-shelf logic for implementing the particular sequencer steps that transform data in accordance with the teachings of the invention. These steps are described in detail hereinafter with reference to an example illustrating how the sequencer functions.

The hardware register for counting the number of bytes to be manipulated during a string operation is depicted in FIG. 1 as 8-bit register 140. The "L-Register" described in the incorporated reference can be used as the counter. According to the preferred embodiment of the invention, L-Register 140 can be either "coupled" (the entire register counts the number of bytes left to be operated on) or "uncoupled" (each nibble in L-Register 140 acts independently, each keeping the byte count of one operand). When the L-Register is coupled and decrements to FF (HEX); or when the L-Register is decoupled and either nibble decrements to F (HEX), the string being processed under the control of a single control word is completed.

Before calling the single control word that governs the operation of the novel sequencer, the following registers, according to a preferred embodiment of the invention, are initialized: (a) registers 105 and 106 are initialized with the first bytes of the data strings to be processed. If only one operand is involved then, it can be assumed (for the sake of illustration only) that register 105 is initialized; (b) RARs 115 and 116 are initialized with the addresses of the main store locations from which the data in registers 105 and 106 was fetched; (c) SDR pointers 125 and 126 are initialized with the byte location of the first SDR byte that is to be operated on; (in each of the respective SDR registers) and (d) L-Register 140 is initialized with the byte count for the string operation.

According to the invention, the entire sequencer operation, under the control of a given control word, is broken into smaller processor operations, sometimes referred to hereinafter as central processor unit or CPU operations. During each CPU operation, data is moved from SDRs 105 and 106, through aligners 135 and 136; is processed by ALU 110; and is then moved back to SDRs 105 and 106, as in the ALU/SDR operation described both hereinabove and in the incorporated reference.

Additionally, according to the invention, the pointers and counters referred to hereinabove are adjusted to indicate string status as each CPU operation completes.

When one or more of the SDRs has no more unprocessed data, the novel sequencer initiates a series of storage operations to/from main store 101, in preparation for the next CPU operation. Before each operation, data mode is determined based on certain constraints (to be defined in detail hereinafter) which are indicated in part by the pointer and counter values. As indicated hereinbefore, data mode provides an indication of the maximum number of bytes that can be operated on by the sequencer during a given CPU (machine) cycle.

According to one embodiment of the invention, the processor manipulates data (for ALU type operations) in one of three possible data modes: fullword (four bytes of data), halfword (two bytes of data) and byte (one byte of data). The preferred embodiment of the invention has 5 data modes (0-4). During intialization the system is set to data mode 0. No string data is processed in data mode 0. Data mode 1 corresponds to the aforementioned byte data mode; data mode 2 corresponds to the aforementioned halfword data mode; data mode 3 corresponds to the aforementioned fullword data mode; and data mode 4 is reserved for processing full doublewords for "MOVE" type operations only.

During a main store string operation, the data mode of any one CPU cycle is constrained by the number of unprocessed bytes in each SDR, the number bytes left to be processed as indicated by L-Register 140, and ALU width (for operations requiring the use of ALU 110). According to the preferred embodiment of the invention, data mode is dynamically predicted each cycle as a function of the current data mode and the aforementioned constraints.

By calculating the data mode for each upcoming CPU cycle, string operation performance is optimized. Successive CPU operations are performed until the L-Register counter(s) indicate that the operands are completely processed, after which a new control word may be executed.

According to the invention, a combination of three characteristics distinguish the novel sequencer from known long string operation controllers: (1) the sequencer processes a maximum number of data bytes for a CPU operation by using the aforementioned dynamic data mode determination scheme (up to 4 bytes in the context of the illustrative system depicted in FIG. 1; except for data moves for which up to 8 bytes can be processed during each cycle); (2) the aforementioned sequencer performs the entire string operation with one control word by using the aforementioned partial machine holdoff scheme; and (3) the sequencer sets up storage control parameters, prior to the need to have storage operations performed, by predicting when the storage operations will take place and which SDRs are involved based on the contents of the various pointers and counters depicted in FIG. 1.

An explanation of how dynamic data mode determination, partial machine holdoff and storage prediction are performed by the novel system, will be set forth hereinafter.

This explanation is followed by a functional description of the sequencer which is set forth in the context of a specific example. The example points out the data transformations performed by the invention when a set of preferred sequencer steps are executed. This illustrative embodiment of the invention refers to FIGS. 2-5 in which the data transformations, resulting from performing the preferred sequencer steps, are depicted. Those skilled in the art will readily be able to implement the novel sequencer using standard off-the-shelf logic after reviewing the aforementioned example and the specific sequence of steps contemplated by the preferred embodiment of the invention.

In order to execute a string operation in the smallest number of CPU cycles possible, a method of determining the data mode for each operation is needed. ALU 110 and aligners 135 and 136 (in processor 102) are shown to handle 4 byte operands, 2 bytes more than are normally handled by commercially available processors. This increases the complexity of determining the data mode for each operation. Normally, data mode is coded into a control word; however, because the same control word is being utilized by the invention for the entire string operation, a dynamic method is needed to change the data mode between CPU operations. Apparent simple solutions to this problem e.g., calculating data mode using the present value of the pointers and operand length, will not work since CPU cycle time is too short to allow the data mode to be calculated and allow the ALU function to complete (within one cycle).

According to the invention, this problem is solved by taking the current value of the pointers, counter and current data mode, and using this information to calculate the data mode for the next ALU operation. Furthermore, according to one embodiment of the invention, the data mode value is latched and used when the next CPU operation takes place. The data mode for the first operation is, as indicated hereinbefore, determined in a first (initial) CPU cycle by using a data mode of 0; all registers are unaltered at the completion of this cycle and the first actual CPU operation is performed during the next cycle.

The object of calculating data mode, as indicated hereinbefore, is to determine the maximum number of bytes that can be processed by the sequencer during each cycle. By calculating $2^{n-1}$, where n is the current data mode value (excluding n=0, i.e., the initial data mode), an adjustment factor results which, when taken together with the value in SDR pointers 125 and 126, indicates a start byte processing location in each of SDRs 105 and 106 for the upcoming machine cycle. This calculation of predicted pointer values, clearly reflects the maximum number of potential bytes that can be processed in each of SDRs 105 and 106 during the upcoming cycle.

This information, together with a predicted count in L-Register 140 (predicted by subtracting the $2^{n-1}$ value referred to hereinabove, from the current count), and the width of the ALU (for ALU type operations), are all the constraints that are necessary to determine the upcoming data mode. It should be recalled that L-Register 140 is either an 8 bit counter or 2 uncoupled 4 bit counters that indicate the byte length of the string (or strings) that remain to be processed.

As indicated hereinabove, a specific example of actual data mode calculation/adjustment (i.e., data mode prediction) utilizing the aforestated constraints, will be set forth hereinafter with reference to FIGS. 2, 3, 4 and 5.

The preferred embodiment of the invention contemplates the use of three types of partial machine holdoffs which allow the system's primary holdoff signal to remain inactive in order to permit the novel sequencer to perform its data transformation process, update registers, etc. The partial machine holdoff signals can be generated by the sequencer by utilizing well known techniques for inhibiting the loading of registers (similar to the techniques used by the system to generate primary holdoff signals).

The first type of holdoff inhibits new data from being clocked into the control store output registers (CSORs). This holdoff assures that no new control words are processed until the desired sequencer operations are complete.

The second type of holdoff, referred to hereinafter as a "pointer holdoff", guarantees that the counters and pointers are not updated, except by the novel sequencer itself which includes means for switching this holdoff signal on and off during its operation.

Finally, the third type of holdoff, guarantees that the condition code register in the processor is updated only after valid ALU operations. This signal functions like the pointer holdoff in that novel sequencer can switch this signal on and off during its operation to allow the condition code register to be updated as needed.

In addition to the Data mode generator, and means for generating and switching the aforementioned partial holdoff signals, the novel sequencer includes a fetch operation/store operation (FOP/SOP) generator which predicts FOPs and SOPs utilizing a four step process.

In the first step, predicted values for pointer registers 125 and 126, and a predicted value for L-Register 140, is calculated in the same manner used to predict data mode. In step two, these predicted values are used to determine if FOPs or SOPs are necessary after the ALU operation completes for the predicted values (i.e., determines if the data in a given SDR has been fully processed and/or needs to be stored). In step three, the predicted FOP and SOP values are latched at the beginning of the valid ALU operation cycle they are intended for. Finally, in step four, the FOPs and SOPs are sent serially to the storage controller to initiate the appropriate fetch or store operation predicted.

Having described in detail the operation and function of the novel sequencer, the specific illustrative example will now be set forth, with reference to FIGS. 2-5. The example and figures illustrate the operating principles of the invention, in particular, how the invention may be used to transform data (i.e., perform string processing tasks).

Figure 2:
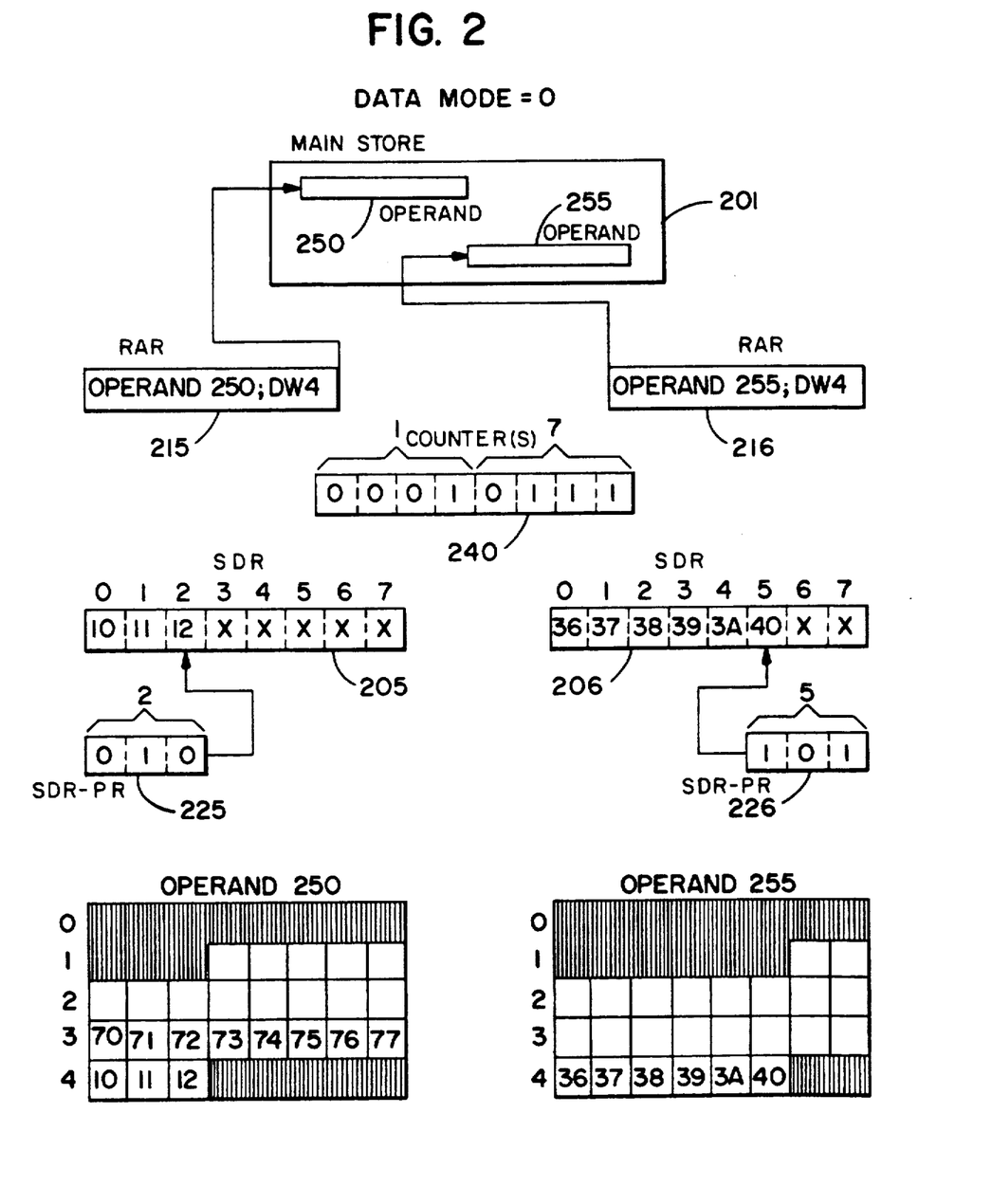
FIG. 2 depicts an illustrative set of initial conditions for the computer system depicted in FIG. 1, which are useful (in conjunction with the written description of the invention set forth hereinafter) in explaining how the novel sequencer transforms data.

FIG. 2 depicts an illustrative set of initial conditions for the computer system depicted in FIG. 1. These initial conditions are transformed by the sequencer in FIGS. 3-5.

In particular, FIG. 2 depicts main store 201; operands 250 and 255 within main store 201; an enlarged view of each of operands 250 and 255; and the initial condition of SDRs 205 and 206, pointer registers 225 and 226, and L-Register 240. Main store 201, operand 250 and operand 255, correspond to main store 101, operand 150 and operand 155 respectively, of FIG. 1. Registers 205, 206, 225, 226 and 240 correspond to registers 105, 106, 125, 126 and 140 of FIG. 1 respectively.

For the sake of illustration, it is assumed that a right to left instruction (e.g., an ADD) is being performed. SDRs 205 and 206 are initialized with the contents of the data word labeled "4" from each of the operand strings. Processing proceeds from the higher memory locations to the lower memory locations to execute a right to left instruction.

The initial byte count in L-Register 240 (assumed to be the full coupled L-Register, i.e., 8 bits long), is set at 17 (HEX); and the present data mode is set to 0 (by definition for initialization). The count in L-Register 240 indicates the byte length of each operand. If the byte counts were different for each operand, the L-Register would be "uncoupled" and comprise two 4 bit counters.

Pointer register 225 is shown having an initial value of 2, indicating that processing in SDR 205 is to start with the byte labeled "2" in FIG. 2. Pointer register 226 is shown having an initial value of 5, indicating that processing in SDR 206 is to start with the byte labeled "5" in FIG. 2.

RARs 215 and 216 (corresponding to RARs 115 and 116 of FIG. 1 respectively), are shown initialized to point at operands 250 and 255 in main store 201. In particular, each of these registers is initialized to point to the doubleword labeled "4" in the expanded view of operands 250 and 255 set forth in the lower portion of FIG. 2.

The expanded view of the first and second operand (operands 250 and 255), also indicates that the byte string for each operand spans several doubleword locations in main store 201. In fact, each operand is shown spanning 4 doublewords, with a range of 24 bytes (17 (HEX) plus one byte so that a decrement of the counter to FF (HEX) signifies a done condition).

In order to transform the data depicted in FIG. 2 in accordance with the teachings of the invention, the novel sequencer performs a six step process during each machine cycle. Several of the steps are skipped during the initialization cycle or during cycles where, for example, no fetches or stores are required. The six steps are as follows:

Step 0: Update present data mode with prior cycle "predicted data mode", and update the current values in the SDR pointer registers and the L-Register with prior cycle predicted values.

Step 1: Align information from the SDRs via the aligners (for an impending ALU operation) using the current SDR pointer values, the current value of the L-Register and present data mode.

Step 2: Perform all ALU operations (if specified) and (if necessary) place the result back into a predetermined one of said SDRs.

Step 3: Predict the SDR pointer registers and the L-Register for the next operation (the updated values are not to be set during the cycle in process; but are to be latched in the succeeding cycle during step 0).

Step 4: Predict data mode for the next operation using the value in the SDR pointer registers, the value in the L-Register and present data mode (e.g., in the manner set forth in detail hereinbefore with reference to the description of the data mode generator), and predict any fetches or stores required after the next CPU operation.

Step 5: Initiate any required fetches or stores.

All 6 steps can occur during each machine cycle. The actual fetching or storing of an operand can take place at a later time.

The first sequencer operation (during the intialization stage) skips steps 0-3 since the data mode is set during initialization to data mode 0. Step 4 is performed to determine the largest operation that can be performed during the next sequencer operation (no active data transformation is performed during the initialization sequence), and determines that no fetch or store will be required after the next CPU operation. It can be seen with reference to FIG. 2 that the maximum number of bytes that can be processed during the subsequent cycle is 2 bytes (a halfword) since the upcoming data mode will be constrained by the amount of data in SDR 205 (bytes 0, 1 and 2). It should be noted that although 3 bytes remain to be processed in SDR 205, the preferred embodiment of the sequencer will only process 1, 2, or 4 bytes for an ALU operation. Hence, the upcoming data mode is predicted to be data mode 2. No fetches or stores will need to be performed following the next CPU operation since at least one byte will remain to be processed in SDR 205. Step 5 is skipped because the initial data mode is 0 and hence no fetches or stores would be necessary to provide data for processing during the next cycle.

Figure 3:
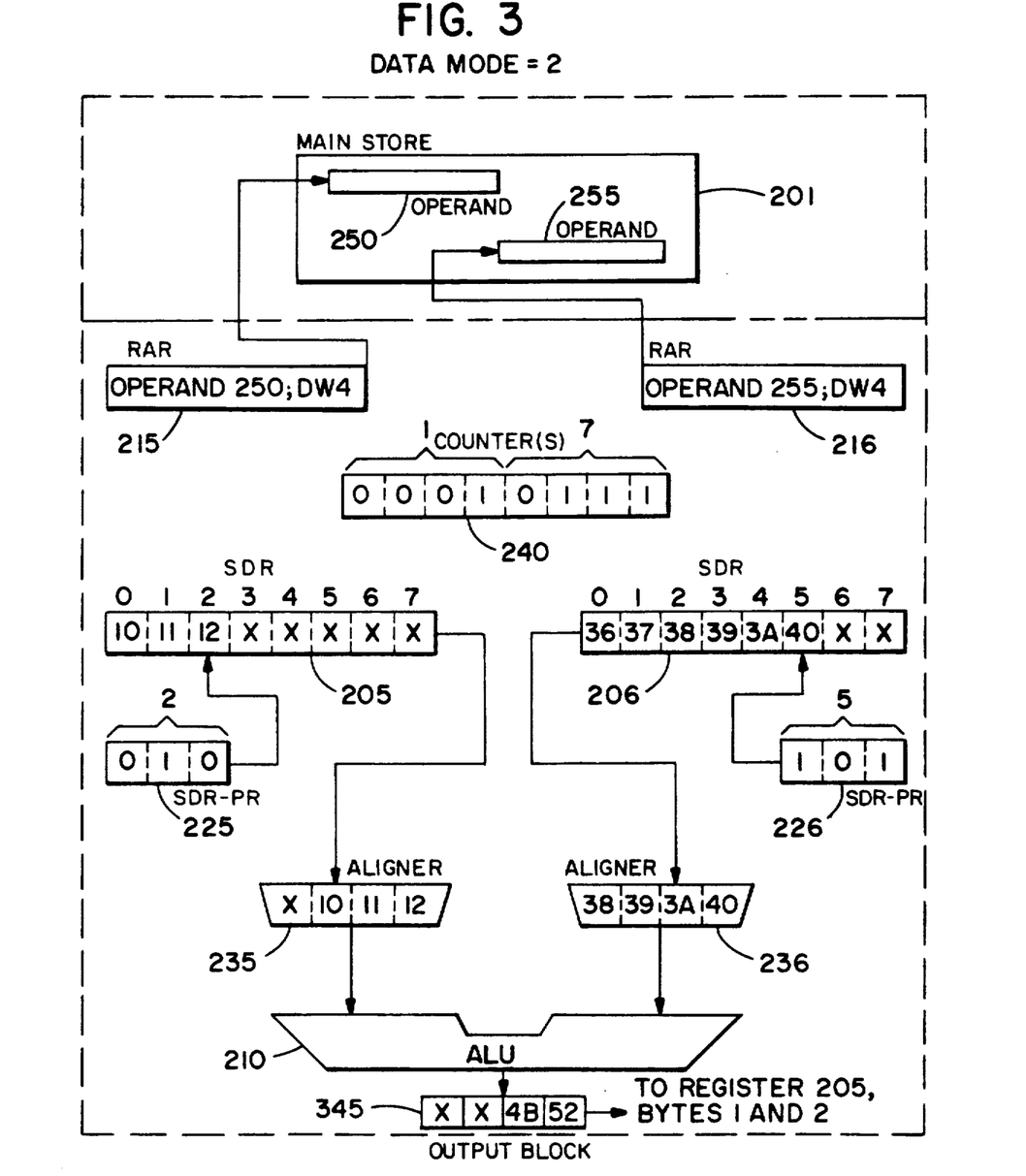
FIGS. 3, 4 and 5 depict, by way of example, the step by step changes to the contents of the various registers of the computer system depicted in FIG. 1, as the data in these registers (initialized as shown in FIG. 2) is operated on by the novel sequencer.

The second sequencer operation in the context of the illustrative example, is depicted in FIG. 3 (in FIG. 3 and subsequent Figures the reference numerals used in FIG. 2 are retained wherever possible to provide consistency in illustrating the steps performed by the sequencer). This second operation would perform step 0, i.e., update the present data mode to reflect data mode 2 (the predicted halfword mode), and update the values in the SDR pointer registers and the L-Register, with prior cycle predicted values. Step 1 would then be performed to align the data from SDRs 205 and 206, for ALU operation. This is depicted in FIG. 3 with the aligned data appearing in aligners 235 and 236 (corresponding to aligners 135 and 136 of FIG. 1). Step 2 is then performed, i.e., ALU 210 (corresponding to ALU 110 of FIG. 1) produces the sum of the hexadecimal values shown in registers 235 and 236 (on a byte by byte basis) and stores the result back to a preselected one of the SDRs. SDR 205 is shown in FIG. 3 receiving the halfword sum produced by ALU 240, via ALU output block 345.

The second sequencer operation continues by predicting the values to be loaded into SDR pointer registers 225 and 226, and L-Register 240, for the next CPU operation (again, these values are not set until the next cycle when they are latched during the next step 0); step 4 is performed to predict the new data mode ($2^{n-1}$ is calculated, where n=2, to obtain an adjustment value of 2, which in turn is used to adjust (but not set) the present SDR pointer register and L-Register values in the process of predicting data mode), with the result being that the single byte remaining to be processed in SDR 205 (byte 0) constrains the upcoming data mode to be data mode 1 (byte mode). Since all the data in SDR 205 will have been processed following the next CPU operation, a fetch and store operation is predicted following this next CPU operation. Once again, no fetches or stores are currently necessary since data exists in the SDRs for processing during the upcoming cycle, and thus the second sequencer operation may be terminated.

Figure 4:
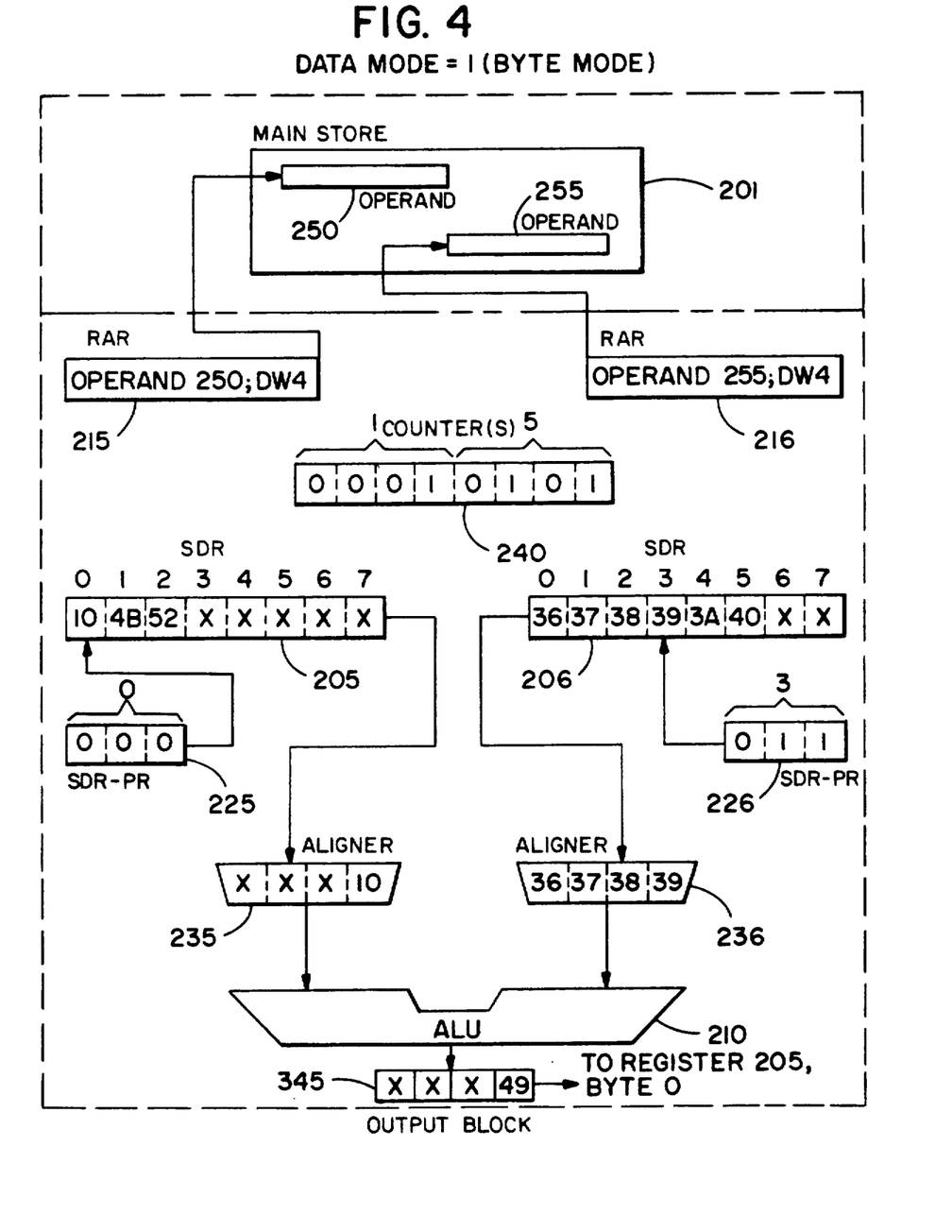

A third sequencer operation is depicted with reference to FIG. 4. This third operation would perform step 0, i.e., update the present data mode to reflect data mode 1 (the predicted byte mode), and update the values in the SDR pointer registers and L-Register, with prior cycle predicted values. Step 1 would then be performed to align the data from SDRs 205 and 206, for ALU operation. This is depicted in FIG. 4 with the aligned data appearing in aligners 235 and 236. Step 2 is then performed, i.e., ALU 210 produces the sum of the hexadecimal values shown in registers 235 and 236, and the result (49 (HEX)) is stored in SDR 205 via ALU output shown in block 345.

Figure 5:
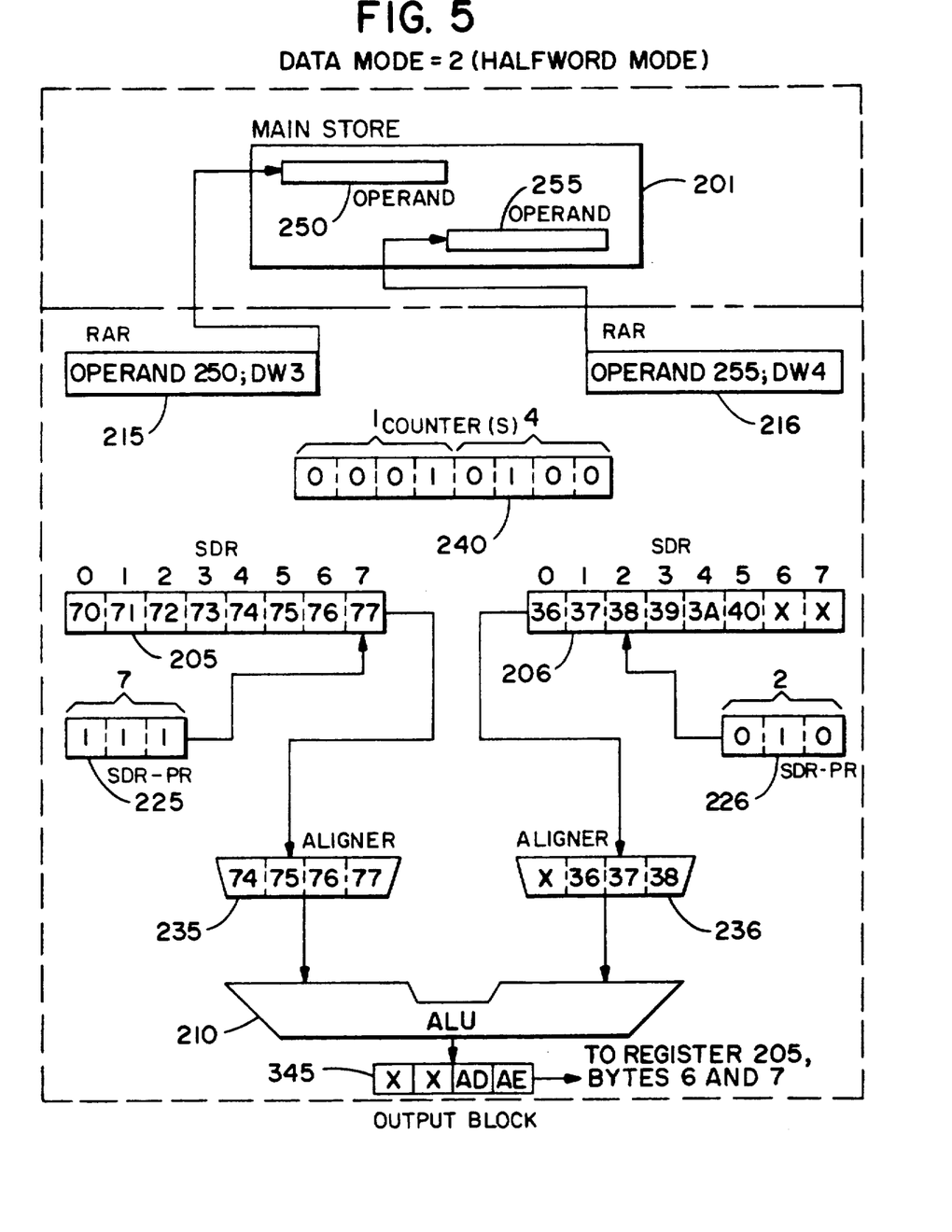

The third sequencer operation continues by once again predicting the values to be loaded into SDR pointer registers 225 and 226, and L-Register 240 (with the predicted values being set in the subsequent cycle as may be observed with reference to FIG. 5). The new data mode for the next cycle is then predicted.

To predict the data mode for the cycle following the cycle of the operation depicted in FIG. 4, $2^{n-1}$ is calculated, where n=1 to obtain an adjustment value of 1. The adjustment value is again used to adjust (but not set) the present SDR pointer register and L-Register values in the process of predicting a data mode.

It can be clearly seen with reference to FIG. 4, that a new doubleword will need to be fetched in order to load register 205 with more data. This is the fetch operation predicted during the aforementioned third sequencer operation. L-Register 240 has not been decremented to FF (HEX), it stands at 15 (HEX), and thus more data exists that needs to be processed. In the case depicted in FIG. 4, the remaining bytes in SDR 206 will be the governing constraint in determining the next data mode. Since the value calculated to adjust pointer register 206 is 1, the predicted pointer value for register 226 will become 2, and thus a data mode equal to 2 (i.e., a halfword data mode) is predicted in step 4, for the upcoming cycle.

Additionally, in step 4, a prediction is again made regarding any fetch or stores required for the upcoming CPU cycle. In the context of the illustrative example none will be required.

In step 5, a masked store is initiated (to main store 201) of the updated contents of register 205 (i.e., 49 (HEX) from the left most byte, together with 4B (HEX), and 52 (HEX) from the neighboring bytes, are the values to be stored). Furthermore, a main store fetch is initiated in step 5 to bring the contents of the next doubleword location for operand 250 into register 205. This is the doubleword from location "3", shown in the expanded view of operand 250 depicted in FIG. 2.

During the next (fourth) sequencer operation, SDR pointers 225 and 226 will be set to 7 and 2 respectively, and L-Register 240 will be set to 14 (since only one byte was processed during the third sequencer operation described hereinabove).

For the following sequencer operation, it will be assumed, for the sake of illustration, that the doubleword fetched contains the hexadecimal values 70–77 in byte positions 0–7 respectively (as shown in the doubleword labeled "3", in the expanded view of operand 250 depicted in FIG. 2).

The fourth sequencer operation, for the illustrative example, is depicted in FIG. 5, where during step 0 the present data mode would be updated to reflect the predicted halfword data mode, and the values in the SDR pointer registers and the L-Register would be updated with prior cycle predicted values. Step 1 would then be performed to align the data from SDRs 205 and 206, for ALU operation. This is depicted in FIG. 5 with the aligned data appearing on aligners 235 and 236. Step 2 is then performed, i.e., ALU 210 produces the sum of the hexadecimal values shown at the output of aligners 235 and 236. The results are again stored back into SDR 205 via ALU output block 345.

The fourth sequencer operation continues by predicting the SDR pointer and L-Register values for the next cycle (step 3), and by predicting (in step 4) byte mode for the next cycle since the governing constraint is the single unprocessed byte that will be left in SDR 206.

By continuing with the processing steps for the fourth sequencer operation, and by continuing with subsequent sequencer operations, following the examples set forth with reference to FIGS. 3–5, those skilled in the art will observe other instances of data being fetched and stored (e.g., the doubleword labeled "3" of operand 255, will be fetched into SDR 206 during the next (fifth) sequencer operation); instances where data mode is set equal to 3 (i.e., where fullword, 4 byte processing is permitted, e.g., during the sixth sequencer operation in the context of the illustrative example), etc.

Eventually all the data associated with operands 250 and 255 will be processed under the control of a single control word without the aid of branch prediction mechanisms, or intervention of horizontal microcode.

The processing sequence terminates, as indicated hereinbefore, when the value in L-Register 240 is decremented to FF (HEX).

What has been described herein with reference to FIGS. 2, 3, 4, and 5 is a specific example of how a sequencer operating in accordance with the principles of the invention, would sequence through and transform one or more data strings. Obviously, the example could be varied in terms of initial conditions, operand choices, etc.; however, the six processing steps set forth and described hereinabove are suitable for processing any initial data set presented to the hardware sequencer in the manner contemplated by the invention.

What has been described hereinabove is a hardware data string operation controller (sequencer) meeting all the objectives set forth hereinbefore.

Those skilled in the art will recognize that the foregoing description and examples included therein, have been presented for the purposes of illustration and description only. The description set forth is not intended to be exhaustive or to limit the invention to the precise form disclosed. Obviously, many modifications and variations are possible in light of the above teaching without departing from the scope or spirit of the invention.

The embodiments and examples set forth herein were presented in order to best explain the principles of the instant invention and its practical application to thereby enable others skilled in the art to make and use the instant invention in various embodiments and with various modifications as are suited to the particular use contemplated.

What is claimed is:

1. A hardware data string operation controller, coupled to both the control store and main store of a data processing system, for performing main store string operations under the control of a single control word fetched from said control store, on at least one byte of variable length operand related data stored at given addresses in said main store during each of a sequence of machine cycles, comparing:
    (a) first and second resolved address registers (RARs) responsive to said given addresses and to an ALU byte length for containing the main store addresses of said operand related data;
    (b) first and second storage data registers (SDRs), coupled to said main store and to said RARs, for buffering main store data;
    (c) at least one counter responsive to the length of said operand data and to said ALU byte length, and used to maintain a count of the total number of unprocessed bytes that remain to be processed in subsequent ones of said machine cycles during the performance of a string operation;
    (d) first and second SDR pointer registers, respectively associated with each of first and second SDRs and responsive to said main store address, to said ALU byte length, and to said counter, for indicating the start byte in each associated SDR that is ready for processing;
    (e) first and second aligner means, respectively coupled between said first and second SDRs, and said ALU, and responsive to said SDR pointer registers, to said ALU byte length, and to said count in said at least one counter for aligning bytes of operand related data that are ready for processing, prior to performing an ALU operation on said operand related data;
    (f) an arithmetic logic unit (ALU), for performing either arithmetic or logical operations on a fixed number of data bytes based upon said ALU operation mode, contained within said first and second SDRs and for replacing the data in at least one of said SDRs, in accordance with an instruction associated with said single control word; and
    means for restoring to said main store the data as replaced in said at least one of said SDRS,
wherein said RARs, said SDR pointer registers, said at least one counter, and said aligner means operate under said single control word.

2. Apparatus as set forth in claim 1 which is operative to process a subset of both left to right and right to left instructions.

3. Apparatus as set forth in claim 1 which is operative to perform variable length main store string operations independent of hroizontal microcode interventino.

4. A method for performing main store string operations, via a hardware data string operation controller coupled to both the control store and main store of a data processing system operating in a number of sequential machine cycles, on at least one byte of variable length operand data at given addresses in said main store under the control of a single control word, comprising the steps of, during each of said machine cycles:
    in response to said given addresses and to an ALU byte length, storing the main store addresses of data from said operand data in first and second resolved address registers (RARs);
    (b) in response to said addresses in said RARs, buffering said operand data into first and second storage data registers (SDRs) coupled to said main store;
    (c) in response to the length of said variable length operand data and to said ALU byte length, maintaining a count, in at least one counter, of the total number of unprocessed bytes that remain to be processed during the performance of a strong operation;
    (d) in response to said addresses in said RARS, to said ALU byte length, and to said count, indicating the start byte in each of said SDR that is ready for processing utilizing first and second SDR pointer registers associated respectively with each of said first and second SDRs;
    (e) in response to said first and second start bytes, to said ALU byte length, and to said count in said at least one counter, aligning bytes of operand data that are ready for processing, prior to performing an ALU operation on said operant data, via first and second aligner means respectively coupled between said first and second SDRs, and said ALU;
    (f) performing in an ALU either arithmetic or logical operations on a fixed number of data bytes, based upon said ALU operation mode, contained within said first and second SDRs, and replacing the data in at least one of said SDRs, in accordance with an instruction associated with said single control word; and
    (g) restoring to said main store the data as replaced in said at least one of said SDRs from said ALU,
wherein steps (a) through (e) are all controlled by said single control word.

* * * * *